United States Patent
Sherman et al.

(10) Patent No.: US 9,627,872 B2
(45) Date of Patent: Apr. 18, 2017

(54) DROP CORD POWER AND/OR DATA SUPPLY ASSEMBLY

(71) Applicant: TARGET BRANDS INC., Minneapolis, MN (US)

(72) Inventors: Ronald Sherman, Minneapolis, MN (US); Doyle J. Trankel, Minneapolis, MN (US)

(73) Assignee: Target Brands Inc., Minneapolis, MN (US)

( * ) Notice: Subject to any disclaimer, the term of this patent is extended or adjusted under 35 U.S.C. 154(b) by 0 days.

(21) Appl. No.: 14/862,746

(22) Filed: Sep. 23, 2015

(65) Prior Publication Data

US 2017/0085072 A1    Mar. 23, 2017

(51) Int. Cl.
| | | |
|---|---|---|
| *H02G 3/22* | (2006.01) | |
| *H02G 1/00* | (2006.01) | |
| *H02G 3/16* | (2006.01) | |
| *H02G 3/20* | (2006.01) | |
| *H02G 3/08* | (2006.01) | |

(52) U.S. Cl.
CPC ............... *H02G 3/22* (2013.01); *H02G 1/00* (2013.01); *H02G 3/086* (2013.01); *H02G 3/16* (2013.01); *H02G 3/20* (2013.01)

(58) Field of Classification Search
CPC ....................................................... H02G 3/18
USPC ............... 307/147; 174/491, 48, 49
See application file for complete search history.

(56) References Cited

U.S. PATENT DOCUMENTS

| | | | |
|---|---|---|---|
| 3,082,290 A | 3/1963 | Ohmit | |
| 3,683,101 A | 8/1972 | Liberman | |
| 3,781,567 A | 12/1973 | Papsco | |
| 3,856,981 A * | 12/1974 | Boundy | E04B 2/7433 160/135 |
| 3,888,282 A | 6/1975 | Liddall | |
| 3,889,044 A | 6/1975 | Flachbarth et al. | |
| 4,015,397 A | 4/1977 | Flachbarth et al. | |
| 4,230,900 A | 10/1980 | Speet | |
| 4,278,834 A | 7/1981 | Boundy | |
| 4,284,840 A | 8/1981 | Baker | |
| 4,286,419 A | 9/1981 | Treffers | |
| 4,399,371 A | 8/1983 | Ziff et al. | |
| 4,540,847 A | 9/1985 | Gardner | |
| 4,686,381 A * | 8/1987 | Boteler | H02G 3/281 174/491 |
| 5,234,360 A * | 8/1993 | Kramer, Jr. | H01R 25/003 439/367 |

(Continued)

*Primary Examiner* — Timothy Thompson
*Assistant Examiner* — Michael F McAllister
(74) *Attorney, Agent, or Firm* — Hamre, Schumann, Mueller & Larson, P.C.

(57) ABSTRACT

A power supply assembly and method for installing in a retail store environment are described. The power supply assembly is relocatable for providing power and/or data to a particular location within the retail store environment. The power supply assembly can provide power and/or data from a power source above a dropped ceiling to a powered fixture without the ceiling panel being set askew, in a manner that may be more aesthetically pleasing and that can satisfy building code requirements. The power supply assembly can be movable to various locations in the retail store environment and does not require installation of a structure such as, but not limited to, a power pole or other beam-like structure in which power cords may be contained.

16 Claims, 4 Drawing Sheets

(56) References Cited

U.S. PATENT DOCUMENTS

| | | | |
|---|---|---|---|
| 6,345,800 | B1 | 2/2002 | Herst et al. |
| 6,677,689 | B2 | 1/2004 | Marihugh et al. |
| 7,081,007 | B1 | 7/2006 | Marchese |
| 7,198,513 | B2 | 4/2007 | Marchese |
| 7,893,567 | B1 | 2/2011 | Deros et al. |
| 8,398,042 | B2 | 3/2013 | Hardy et al. |
| 2005/0072090 | A1 | 4/2005 | Mclaughlin |
| 2013/0014985 | A1* | 1/2013 | Ferrara ................. H02G 11/02 174/491 |
| 2014/0315423 | A1 | 10/2014 | Cole et al. |

\* cited by examiner

DROP CORD POWER AND/OR DATA SUPPLY ASSEMBLY

FIELD

This disclosure relates generally to a power supply assembly. More specifically, the disclosure relates to a relocatable power supply assembly for providing power and/or data to a particular location within a room.

BACKGROUND

Providing power to various locations in, for example, a retail store environment is an ongoing problem. Typically, when a new location in the retail store environment requires power (e.g., to power a sales display, etc.) an electrician installs a power pole that feeds from an existing power source. However, providing a new power pole on the sales floor can be expensive and requires an electrician for safe installation. Also, once the power pole is installed, it is difficult to remove and typically remains a permanent addition to the retail store environment.

SUMMARY

A power supply assembly and method of installing the power supply assembly are described herein. In some embodiments, the power supply assembly is relocatable and can be used to provide power and/or data to a particular location within a room.

The power supply assembly includes a ceiling panel for a ceiling grid, the ceiling panel having an aperture therethrough and having a top side and a bottom side, the top side being disposed facing a roof of a structure when the ceiling panel is installed in the ceiling grid; a frame secured to the ceiling panel, the frame being secured to the top side of the ceiling panel, whereby the frame is disposed on the top side of the ceiling panel when the ceiling panel is installed in the ceiling grid; a junction secured to a surface of the frame; a cord passing through the aperture, a first end of the cord being connected to the junction; a strain relief device secured to the frame and secured to the cord; and a support member secured to the frame for supporting the frame from the roof when the power supply assembly is installed in the ceiling grid.

A power supply assembly in a retail store environment is described. The retail store environment includes a roof, a ceiling suspended from the roof, the ceiling including a plurality of ceiling panels suspended on a grid, and a powered fixture on a floor of the retail store environment. The power supply assembly includes a ceiling panel for the grid, the ceiling panel having an aperture therethrough and having a top side and a bottom side, the top side being disposed facing the roof when the ceiling panel is installed on the grid; a frame secured to the ceiling panel, the frame being secured to the top side of the ceiling panel, whereby the frame is not visible from the floor of the retail store environment when the ceiling panel is installed on the grid; a cord passing through the aperture, a first end of the cord being electrically connected to a power source and a second end of the cord being electrically connected to the powered fixture; a strain relief device secured to the frame securing the cord to the frame; and a support member secured to the frame and to the roof for supporting the frame from the roof. A method of installing a power supply assembly in a retail store environment is described. The retail store environment includes a roof, a ceiling suspended from the roof, the ceiling including a plurality of ceiling panels suspended on a grid, and a powered fixture on a floor of the retail store environment. The method includes removing one of the plurality of ceiling panels from the grid; connecting the power supply assembly to a power source, the power source being disposed between the ceiling panels and the roof; securing a support member of a frame of the power supply assembly to the roof; and installing the power supply assembly in place of the removed one of the plurality of ceiling panels.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

In a retail store environment, for example, a location at which power is needed (e.g., for a powered fixture such as, but not limited to, a refrigerator for grocery items, a display with lighting needs, a checkout line, a marketing display, etc.) can change over time. To provide power to any location, some retail stores may drop a power cord from a ceiling space of the retail store environment. In retail store environments which include, for example, a dropped ceiling, a power cord may be plugged in to a power source above the dropped ceiling and provided to the powered fixture. This can, for example, be accomplished by setting a ceiling panel of the dropped ceiling aside. In some instances, this may not be aesthetically pleasing, as the ceiling panel is askew. Further, in some instances a building code (e.g., a fire code, etc.) may not permit such a setup. Accordingly, embodiments of this disclosure are directed to providing a power supply assembly which can provide power from a power source above a dropped ceiling to a powered fixture without the ceiling panel being set askew, in a manner that may be more aesthetically pleasing and that can satisfy the building code requirements. The power supply assembly as described in this specification can be movable to various locations in the retail store environment and does not require installation of a structure such as, but not limited to, a power pole or other beam-like structure in which power cords may be contained.

It will be appreciated that the embodiments described in this specification can also be applied to, for example, a stock room environment, a warehouse environment, an office space environment, or the like. Further, the embodiments described in this specification may be utilized in any environment in which a dropped ceiling is installed, including residential spaces such as basements or the like.

A retail store environment, as used in this specification, can refer to, for example, a retail store. The retail store environment can include, for example, a sales floor that includes one or more aisles that can include shelves to stock merchandise, one or more marketing displays and sales floor fixtures (e.g., a gondola), one or more checkout lines where a point of sale can occur (e.g., where customers can pay for merchandise), or the like.

Power supply, as used in this specification, can refer to the supplying of power and/or data.

Figure 1:
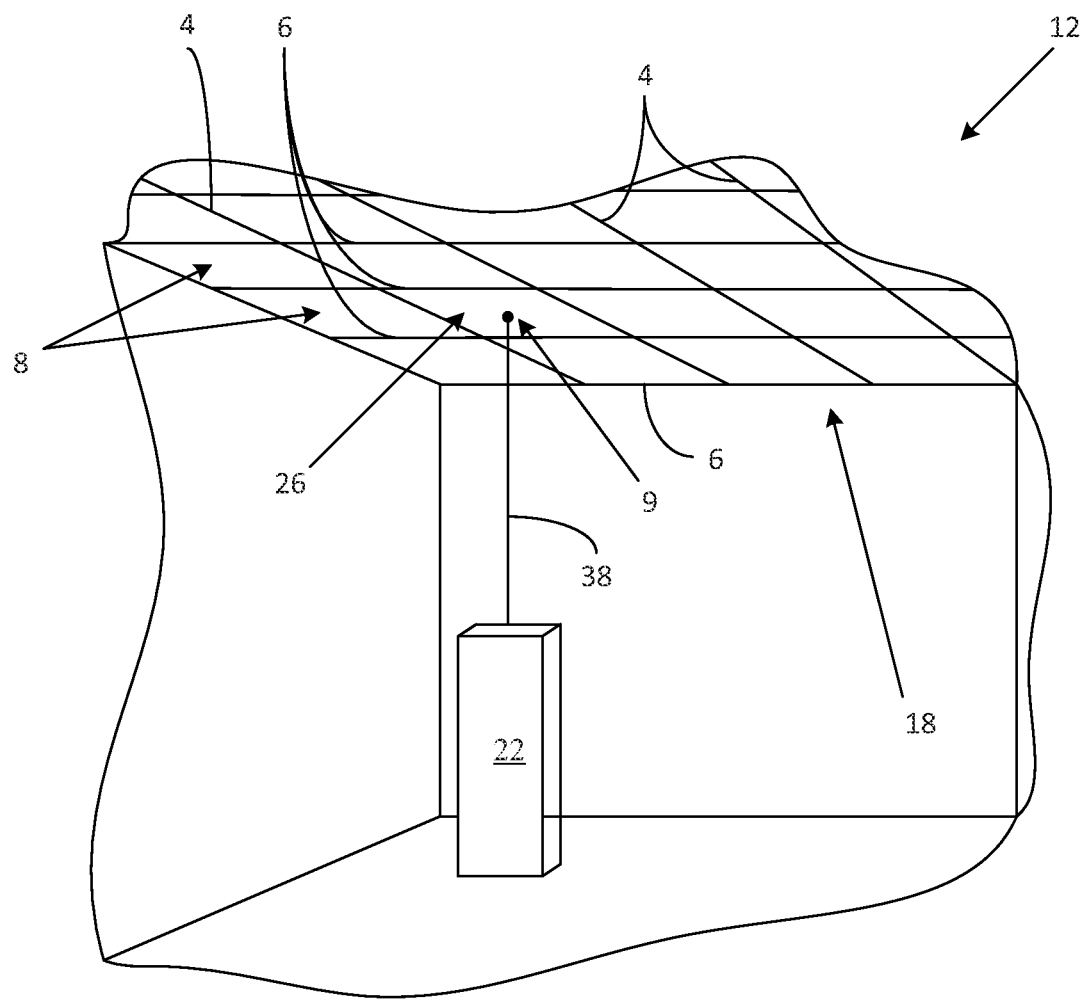
FIG. 1 illustrates a retail store environment including a power supply assembly, according to some embodiments.

FIG. 1 illustrates a retail store environment 12 including a power supply assembly (e.g., power supply assembly 10 of FIGS. 2-3), according to some embodiments. The retail store environment 12 includes a ceiling 18. The ceiling 18 may generally be referred to as a dropped ceiling, a suspended ceiling, a false ceiling, or the like. The ceiling 18 can be suspended below a roof structure (e.g., roof 14 of FIG. 2) from hanging wires, etc. (not shown). The ceiling 18 is generally representative of a ceiling grid. In such embodiments, the ceiling 18 includes a grid structure that includes a plurality of support structures 4, 6. The support structures 4, 6 are generally arranged perpendicularly to each other and span a length and width of the retail store environment 12. The support structures 4, 6 can be made of a variety of materials such as, but not limited to, metal, or the like. The support structures 4, 6 support a plurality of ceiling panels 8. The ceiling panels are generally removable and can be replaceable. The ceiling panels 8 are substantially similar such that a uniform appearance of the ceiling 18 is provided when viewed by an individual in the retail store environment 12. The ceiling panels 8 can be made of a variety of materials such as, but not limited to, fiberboard, plastic, or the like. The ceiling panels 8 can be made of a sound absorbent material and can, in some embodiments, include insulation disposed on an upper side of the ceiling panels 8. The ceiling panels 8 can be a standard size (e.g., 2 ft.×2 ft., 2 ft.×4 ft., etc.). It will be appreciated that the ceiling panel 8 size can vary beyond the stated values. In some embodiments, the ceiling 18 can be made of a combination of different sized ceiling panels 8.

A power supply assembly (e.g., power supply assembly 10 of FIGS. 2-3) can be installed in place of one or more of the ceiling panels 8. The power supply assembly includes a cord 38 and a ceiling panel 26. The ceiling panel 26 can be substantially the same in materials, size, appearance, etc., as the ceiling panels 8 such that the ceiling 18 can retain a uniform appearance even when the power supply assembly is installed in place of one or more of the ceiling panels 8. The power supply assembly will be described in additional detail in accordance with FIGS. 2-3 below. The ceiling panel 26 includes an aperture 9 through which a cord 38 extends, the cord 38 providing power and/or data to a powered fixture 22. In some embodiments, the ceiling panel 26 is disposed directly above the powered fixture 22. The cord 38 can be, for example, a single cord including power, data, or power and data. In some embodiments, the cord 38 can be, for example, a plurality of cords 38. In such embodiments, a first of the plurality of cords 38 can provide power and a second of the plurality of cords 38 can provide data to the powered fixture 22. Further, in such embodiments, the cords 38 can be secured together such that the cords 38 appear visually to be a single cord 38.

Figure 2:
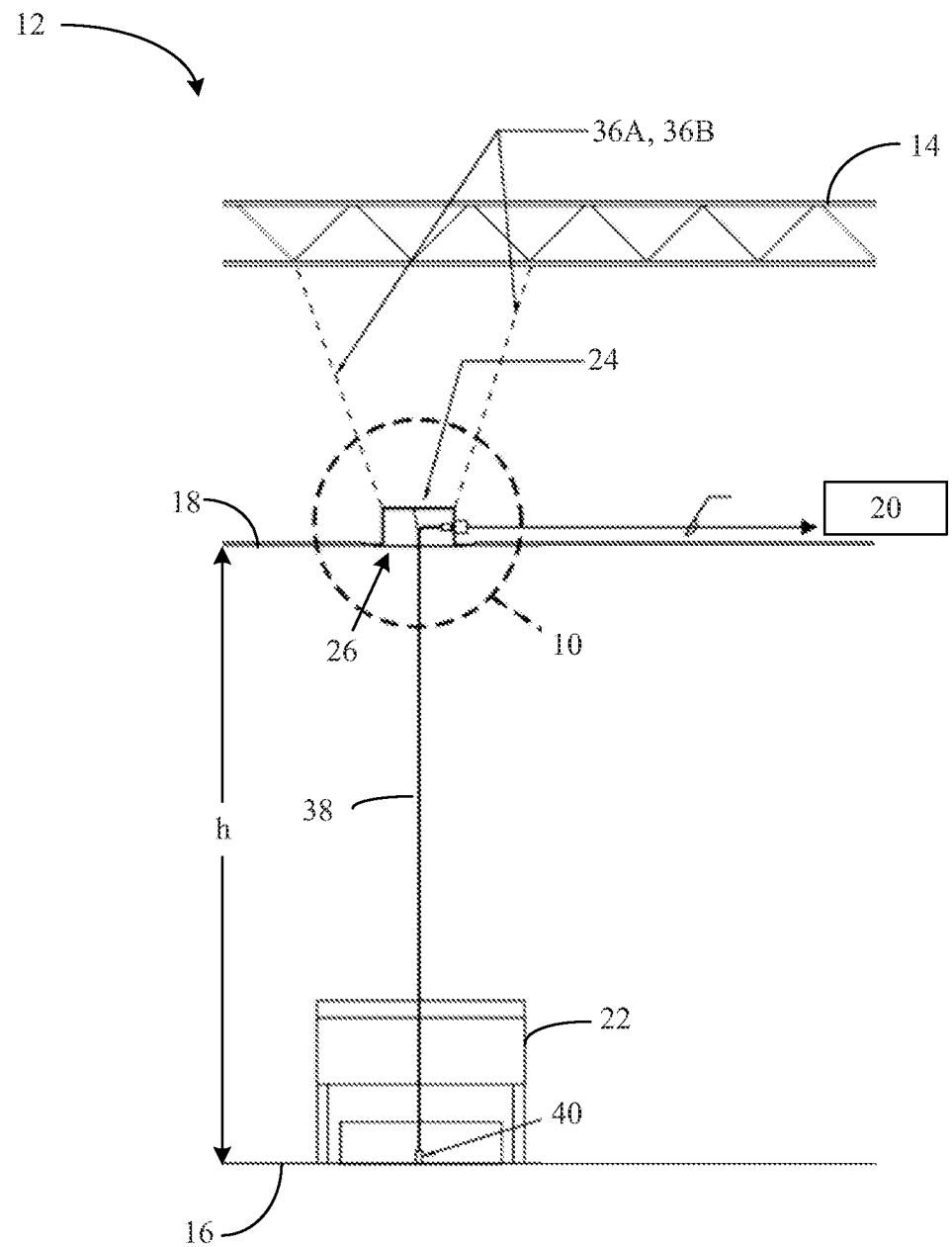
FIG. 2 illustrates a power supply assembly installed in a retail store environment, according to some embodiments.

FIG. 2 illustrates the power supply assembly 10 installed in the retail store environment 12, according to some embodiments. It will be appreciated that the retail store environment 12 can alternatively be a stock room environment, warehouse environment, office space environment, or the like. Further, in some embodiments, the power supply assembly 10 can be installed in a residential space (e.g., a basement, etc.).

As illustrated, the retail store environment 12 generally includes a roof 14, a floor 16, and the ceiling 18. The ceiling 18 can be suspended below the roof 14 from hanging wires, etc. (not shown).

The retail store environment 12 further includes a power source 20. The power source 20 can provide a power source, a data source, or a combination power and data source. The power source 20 can be, for example, disposed between the ceiling 18 and the roof 14 in the retail store environment 12. There may be more than one power source 20 disposed above the ceiling 18 of the retail store environment 12. In such embodiments, the multiple power sources 20 can be disposed in various locations of the store. In some embodiments, the multiple power sources 20 may provide different output voltages. For example, one power source 20 may provide at or about 120-volt output voltage, while another power source 20 may provide at or about 208-volt output voltage.

In the illustrated embodiment, the power supply assembly 10 is electrically connected to a powered fixture 22 by cord 38. The powered fixture 22 can be located anywhere in the retail store environment 12. A single powered fixture 22 is illustrated. It will be appreciated that the retail store environment 12 can include a plurality of powered fixtures 22. In general, the powered fixture 22 can be a movable fixture that can be located throughout the retail store environment 12. As the powered fixture 22 can be moved to different locations in the retail store environment 12, the power supply assembly 10 can be moved to the various locations in order to continue to supply power and/or data to the powered fixture 22 as needed. The powered fixture 22 can be any of a variety of fixtures which require power and/or data. Examples of the powered fixture 22 include, but are not limited to, refrigerators for grocery items (e.g., for fresh or frozen food items, beverages, etc.), marketing stands, demonstration areas for powered items (e.g., tool demonstration, household item demonstration, electronics demonstration, etc.), one or more checkout lines where a point of sale can occur (e.g., where customers can pay for merchandise), or the like. It will be appreciated that these are examples and that other fixtures utilizing power and/or data are possible.

The powered fixture 22 can include an input junction 40 at which the cord 38 can be connected to provide power and/or data to the powered fixture 22. In some embodiments, the input junction 40 can be a female connection and an end of the cord 38 connected thereto can be a male connection. It will be appreciated that in some embodiments, the configuration of the male and female connections can be reversed such that the input junction 40 is a male connection and the end of the cord 38 connected thereto is a female connection.

The power supply assembly 10 includes a frame 24 secured to a ceiling panel 26. The cord 38 electrically connects the power source 20 to the powered fixture 22. The cord 38 can be a standard extension cord. A length of the cord 38 can be selected based on a distance h between the ceiling 18 and the floor 16. In some embodiments, the length of the cord 38 can be less than the distance h between the ceiling 18 and the floor 16 such as, for example, if the input junction 40 at the powered fixture 22 is disposed above the floor 16. In some embodiments, the length of the cord 38 can be greater than the distance h between the ceiling 18 and the floor 16 such as, for example, to provide slack in the cord 38 when it is electrically connected to the powered fixture 22. In some embodiments this can, for example, provide for slight relocation of the powered fixture 22. The cord 38 can be, in some embodiments, white in color. It will be appreciated that the color of the cord 38 can be selected based on any design considerations and that the color is not intended to be limiting. In some embodiments, the cord 38 can be flexible. It will be appreciated that the cord 38 can be a power cord, a data cord, a combination power and data cord, or the like. In some embodiments, the cord 38 can include four 12-gage wires (e.g., a 12/4 American Wire Gage (AWG) cord). In some embodiments, the cord 38 can include three 12-gage wires (e.g., a 12/3 AWG cord). It will be appreciated that these cords are examples and that other cords can be used in accordance with the principles described in this specification.

The power supply assembly 10 can be configured to provide an output voltage at a required output voltage level. The output voltage level of the power supply assembly 10 can be based on, for example, power requirements for the powered fixture 22. The power source 20 can be selected according to the output voltage level of the power supply assembly 10 and the power requirements of the powered fixture 22. For example, in some embodiments, the power supply assembly 10 can be designed to provide at or about 208-volt power to the powered fixture 22. In some embodiments, the power supply assembly 10 can be designed to provide at or about 120-volt power to the powered fixture 22. The various aspects of the power supply assembly 10 are accordingly selected to accommodate the desired output voltage level. It will be appreciated that these output voltage levels are intended to be examples. The power supply assembly 10 can be designed such that other voltages can be supplied according to the principles described in this specification.

The power supply assembly 10 includes support members 36A, 36B. The support members 36A, 36B are connected to the frame 24 of the power supply assembly 10 and the roof 14 of the retail store environment 12. The support members 36A, 36B can provide additional support for the weight of the power supply assembly 10 when installed in the ceiling 18. The support members 36A, 36B and the additional support from the roof 14 can enable ceiling panel 26 to be made of the same material as the ceiling panels 8 (FIG. 1) in the ceiling 18. The support members 36A, 36B can be, for example, chain, wire, etc.

Figure 3:
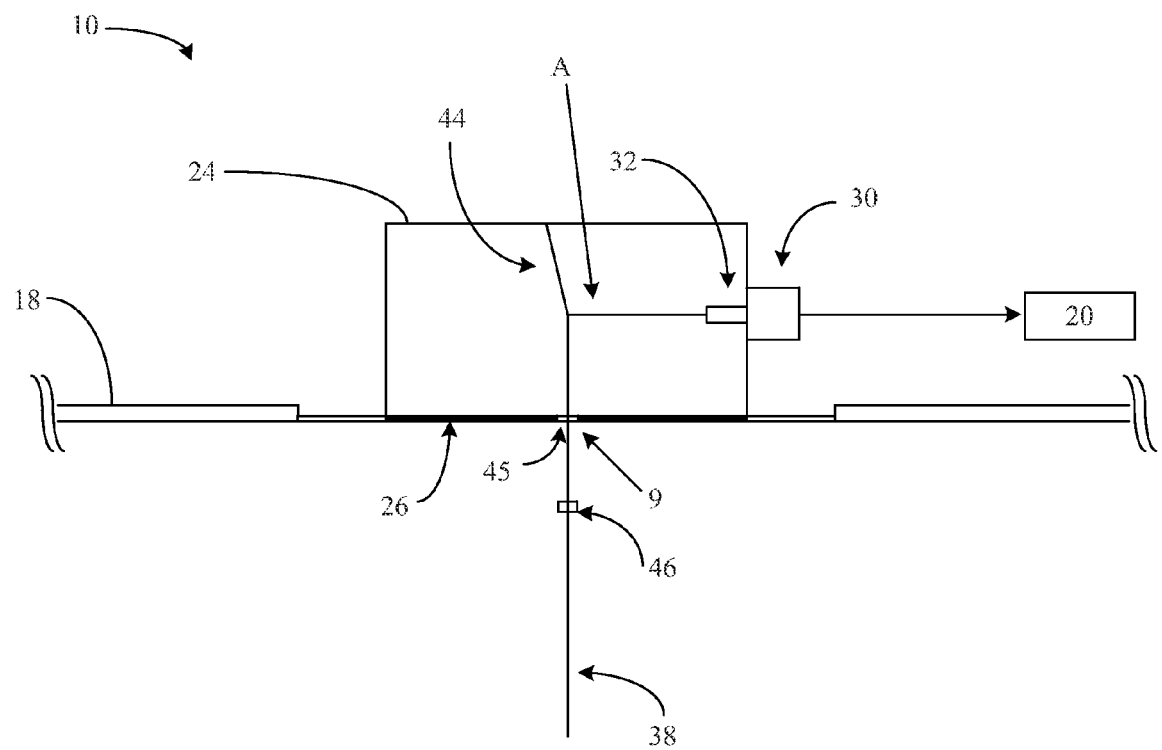
FIG. 3 illustrates the power supply assembly of FIG. 2, according to some embodiments.

FIG. 3 illustrates the power supply assembly 10 of FIG. 2, according to some embodiments. The power supply assembly 10 includes the ceiling panel 26. The frame 24 is secured to the ceiling panel 26. The frame 24 can be open on one or more sides, according to some embodiments. The frame 24 can alternatively be closed on one or more sides. The frame 24 can be removably secured to the ceiling panel 26, according to some embodiments. As a result, in some embodiments, if the ceiling panel 26 breaks, becomes discolored, etc., the frame 24 can be secured to another ceiling panel 26. In some embodiments the frame 24 can be made of metal, plastic, or the like, as well as suitable combinations thereof. The ceiling panel 26 includes the aperture 9 such that the cord 38 can extend therethrough. The aperture 9 can generally be disposed at or about a center of the ceiling panel 26. It will be appreciated that the location of the aperture 9 can be varied. For example, the aperture 9 could be disposed at a location other than at or about the center of the ceiling panel 26. A retaining member 45 such as, but not limited to, a grommet, can be installed in the aperture to, for example, prevent tearing or abrasion of the cord 38 from the material of the ceiling panel 26.

The frame 24 is illustrated as having a rectangular cross-section. The particular geometry of the frame 24 can be modified. A junction 30 is secured to the frame 24. The junction 30 can alternatively be referred to as a junction box 30. In an embodiment in which the cord 38 is a data cord, the junction 30 can be a data junction. The junction 30 could alternatively be disposed on an interior side of the frame 24, according to some embodiments. In general, the junction 30 is configured to be electrically connected to the cord 38. For example, in some embodiments, the junction 30 is a female receptacle configured to receive a male end 32 of the cord 38. It will be appreciated that the junction 30 can alternatively be a male connection and the end 32 of the cord 38 can be a female connection, according to some embodiments. The junction 30 is disposed vertically above the ceiling panel 26. In some embodiments, the junction 30 can be disposed at or about a middle of the frame 24. A portion A of the cord 38 extends from the male end 32 to a location vertically above the aperture 9 in the ceiling panel 26.

A strain relief device 44 is secured to a top portion of the frame 24 and can suspend the cord 38 above the ceiling panel 26. The strain relief device 44 is secured to the frame 24 and the cord 38. The strain relief device 44 can prevent accidental disconnection of the cord 38 from the junction 30. The strain relief device 44 can be, for example, elastic such that if the cord 38 is pulled toward the floor 16 (FIG. 2) of the retail store environment 12 (FIG. 2), the strain relief device 44 will stretch, but can prevent the male end 32 of the cord 38 from becoming disconnected from the junction 30. For example, the strain relief device 44 can be a bungee cord or the like which is secured to the frame and supports the cord 38 from a lower side of the cord 38. In some embodiments, the strain relief device 44 may not be elastic.

In some embodiments, a retaining member 46 can be disposed on the cord 38 vertically lower than the ceiling panel 26. This can, for example, prevent the ceiling panel 26 from sliding down the cord 38 toward the floor 16 should the ceiling panel 26 come loose from the frame 24. The retaining member 46 can be, for example, an O-ring or the like. The retaining member 46 generally has a diameter that is larger than the diameter of the aperture 9.

Figure 4:
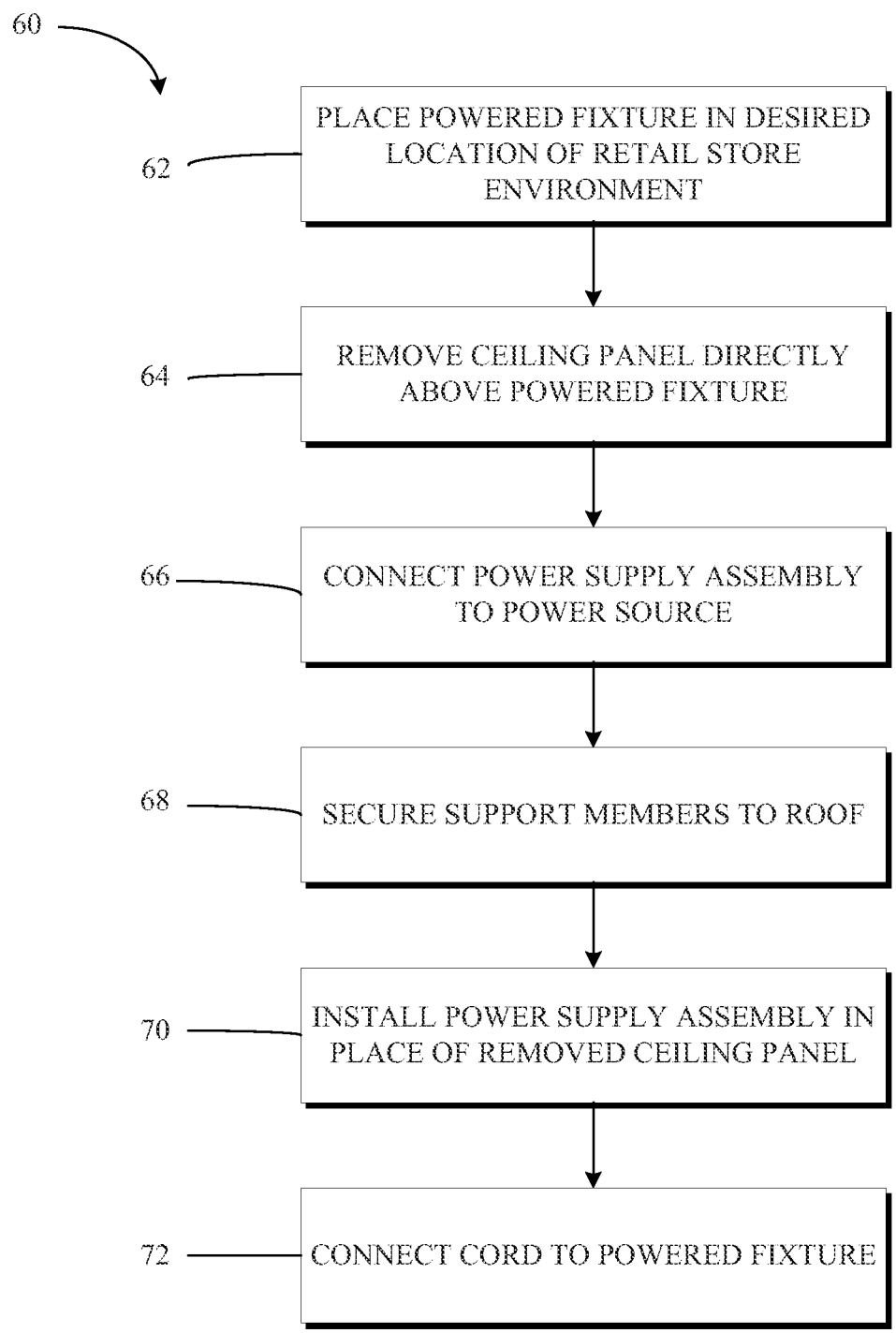
FIG. 4 illustrates a flowchart of a method for installing the power supply assembly of FIGS. 2-3, according to some embodiments.

FIG. 4 illustrates a flowchart of a method 60 for installing the power supply assembly 10 of FIGS. 2-3, according to some embodiments. At 62, the powered fixture 22 (FIG. 2) is placed in a desired location of the retail store environment 12 (FIG. 2). The powered fixture 22 can be placed anywhere throughout the retail store environment 12. Once the powered fixture 22 is in the desired location, one of the ceiling panels 8 (FIG. 1) disposed directly above the powered fixture 22 can be removed at 64. The removal of the ceiling panel 8 will provide a location at which the power supply assembly 10 including the ceiling panel 26 (FIG. 3) can be installed. At 66, the power supply assembly 10, particularly the junction 30 (FIG. 3), is electrically connected to the power source 20 (FIG. 2) and the support members 36A, 36B (FIG. 2) are secured to the roof 14 (FIG. 2) at 68. At 66 the cord 38 (FIGS. 1-3) may also be electrically connected to the junction 30. Once the junction 30 is electrically connected to the power source 20 and the power supply assembly 10 is supported from the roof 14 by the support members 36A, 36B, the power supply assembly 10 is installed in place of the removed ceiling panel at 70. Installing the power supply assembly 10 can, for example, include placing the ceiling panel 26 of the power supply assembly 10 such that it is supported by the ceiling grid of the ceiling 18 (FIG. 2). The cord 38 can then be dropped to the powered fixture 22 and electrically connected to the powered fixture 22 at 72.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

What is claimed is:

1. A power supply assembly, comprising:
   a ceiling panel for a ceiling grid, the ceiling panel having an aperture therethrough and having a top side and a bottom side, the top side being disposed facing a roof of a structure when the ceiling panel is installed in the ceiling grid;
   a frame secured to the ceiling panel, the frame being secured to the top side of the ceiling panel, whereby the frame is disposed on a top side of the ceiling grid when installed in the ceiling grid;
   a junction box secured to the frame;
   a cord passing through the aperture, a first end of the cord being electrically connected to the junction box;
   an elastic strain relief device secured to the frame and secured to the cord that suspends a portion of the cord above the ceiling panel, the strain relief device being disposed on the top side of the ceiling panel and configured to prevent disconnection of the cord from the junction box;
   a retaining member disposed in the aperture, the retaining member configured to prevent tearing of the cord; and
   a support member secured to the frame that in use supports the frame from the roof when the power supply assembly is installed in the ceiling grid.

2. The power supply assembly according to claim 1, wherein the cord is a power cord and the junction box is a power junction.

3. The power supply assembly according to claim 2, wherein the first end of the cord is a male connection connected to a female connection of the junction, and a second end of the cord is electrically connectable to a powered fixture.

4. The power supply assembly according to claim 2, wherein the cord is flexible.

5. The power supply assembly according to claim 4, wherein the cord is one of a 12/4 American Wire Gage (AWG) cord and a 12/3 AWG cord.

6. The power supply assembly according to claim 1, wherein the cord is a data cord and the junction is a data junction.

7. The power supply assembly according to claim 1, wherein the aperture is disposed at a center of the ceiling panel.

8. A power supply assembly in a retail store environment, the retail store environment including a roof, a ceiling suspended from the roof, the ceiling including a plurality of ceiling panels suspended on a grid, and a powered fixture on a floor of the retail store environment, the power supply assembly comprising:
   a ceiling panel for the grid, the ceiling panel having an aperture therethrough and having a top side and a bottom side, the top side being disposed facing the roof when the ceiling panel is installed on the grid;
   a frame secured to the ceiling panel, the frame being secured to the top side of the ceiling panel, whereby the frame is not visible from the floor of the retail store environment when the ceiling panel is installed on the grid;
   a cord passing through the aperture, a first end of the cord being electrically connected to a power source and a second end of the cord being electrically connected to the powered fixture;
   an elastic strain relief device secured to the frame securing the cord to the frame that suspends a portion of the cord above the ceiling panel, the strain relief device being disposed on the top side of the ceiling panel and configured to prevent disconnection of the cord from the junction box;
   a retaining means disposed in the aperture, the retaining member configured to protect the cord; and
   a support member secured to the frame and to the roof for supporting the frame from the roof.

9. The power supply assembly according to claim 8, further comprising a junction secured to the frame, the junction being connected to the power source.

10. The power supply assembly according to claim 9, wherein the cord is a power cord.

11. The power supply assembly according to claim 10, wherein the cord is one of a 12/4 American Wire Gage (AWG) cord and a 12/3 AWG cord.

12. The power supply assembly according to claim 8, wherein the cord is a combination power and data cord that provides power and data to the powered fixture.

13. The power supply assembly according to claim 8, wherein the aperture is disposed at a center of the ceiling panel.

14. The power supply assembly according to claim 8, wherein the strain relief device secures the cord such that the cord is suspended from the strain relief device.

15. The power supply assembly according to claim 1, further comprising a second retaining member vertically lower than the ceiling panel and spaced apart from the ceiling panel, the second retaining member having a diameter that is larger than a diameter of the aperture.

16. The power supply assembly according to claim 1, wherein the frame is rectangular and is open on one or more sides.

* * * * *